(12) United States Patent
Kopetz

(10) Patent No.: US 11,489,636 B2
(45) Date of Patent: Nov. 1, 2022

(54) FAULT-TOLERANT DISTRIBUTION UNIT AND METHOD FOR PROVIDING FAULT-TOLERANT GLOBAL TIME

(71) Applicant: TTTech Computertechnik AG, Vienna (AT)

(72) Inventor: Hermann Kopetz, Baden (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 145 days.

(21) Appl. No.: 17/180,941

(22) Filed: Feb. 22, 2021

(65) Prior Publication Data
US 2021/0328730 A1    Oct. 21, 2021

(30) Foreign Application Priority Data

Apr. 21, 2020 (EP) ..................................... 20170672

(51) Int. Cl.
*H04L 1/22* (2006.01)
*H04L 1/18* (2006.01)
(Continued)

(52) U.S. Cl.
CPC .............. *H04L 1/22* (2013.01); *H04L 1/1812* (2013.01); *H04L 1/1822* (2013.01);
(Continued)

(58) Field of Classification Search
CPC ... H04L 1/00; H04L 1/22; H04L 67/10; H04L 67/1095; H04L 1/18; H04L 1/1812;
(Continued)

(56) References Cited

U.S. PATENT DOCUMENTS 9,429,983 B1 * 8/2016 Chall .................. G06F 1/10
2004/0088597 A1 * 5/2004 Wu .................... G06F 1/04
713/500

(Continued)

OTHER PUBLICATIONS

European Search Report of European Application No. 20170672.8 dated Oct. 9, 2020.

*Primary Examiner* — Warner Wong
(74) *Attorney, Agent, or Firm* — Eversheds Sutherland (US) LLP

(57) ABSTRACT

The invention relates to a method for providing a fault-tolerant global time and for the fault-tolerant transport of time-controlled messages in a distributed real-time computer system which comprises external computers and a fault-tolerant message distribution unit, FTMDU. The FTMDU comprises at least four components which supply the global time to the external computers by means of periodic external synchronization messages, wherein the external computers each set their local clock to the received global time, wherein each external sender of a time-controlled message transmits two message copies of the message to be sent via two different communication channels to two different components of the FTMDU at periodic sending times defined a priori in timetables, wherein these two message copies are delivered within the FTMDU via two independent communication paths to those two components of the FTMDU which are connected to an external receiver of the message via communication channels.

16 Claims, 3 Drawing Sheets

(51) Int. Cl.
*H04L 67/1095* (2022.01)
*H04L 7/00* (2006.01)
*H04L 12/40* (2006.01)
*G06F 1/04* (2006.01)

(52) U.S. Cl.
CPC ............ *H04L 67/1095* (2013.01); *G06F 1/04* (2013.01); *H04L 7/0083* (2013.01); *H04L 12/40176* (2013.01)

(58) Field of Classification Search
CPC ....... H04L 1/1822; H04L 1/1678; H04L 7/00; H04L 7/0008; H04L 2012/5674; H04L 27/2655; H04L 7/0083; H04L 12/40176; G06F 1/04; G06F 1/10; G06F 1/14
See application file for complete search history.

(56) References Cited

U.S. PATENT DOCUMENTS

| | | |
|---|---|---|
| 2009/0083466 A1 | 3/2009 | Hartwich et al. |
| 2012/0117415 A1* | 5/2012 | Arumugham ............ G06F 1/10 713/503 |
| 2013/0031217 A1* | 1/2013 | Rajapakse ............... H04N 21/20 709/219 |
| 2013/0086432 A1 | 4/2013 | Bauer et al. |
| 2016/0366686 A1 | 12/2016 | Steiner |
| 2016/0380858 A1* | 12/2016 | Poledna ................... H04L 1/22 709/224 |
| 2017/0063985 A1* | 3/2017 | Xun ....................... H04J 3/0641 |
| 2017/0111140 A1* | 4/2017 | Poledna .................. H04L 1/189 |
| 2017/0338938 A1* | 11/2017 | Fang ..................... H04J 3/0638 |
| 2019/0166567 A1* | 5/2019 | Al-Shaikhi ......... H04W 56/001 |

\* cited by examiner

FAULT-TOLERANT DISTRIBUTION UNIT AND METHOD FOR PROVIDING FAULT-TOLERANT GLOBAL TIME

CROSS-REFERENCE TO RELATED APPLICATIONS

The present application claims priority to and the benefit of European Application No. 20170672.8, filed Apr. 21, 2020, which is hereby incorporated by reference herein in its entirety.

FIELD

The invention relates to a method for providing a fault-tolerant global time and for the fault-tolerant transport of time-controlled messages in a distributed real-time computer system which comprises external computers and a fault-tolerant message distribution unit, FTMDU, wherein each external computer can be an external sender and/or an external receiver of messages.

The invention also relates to an FTMDU.

Finally, the invention relates to a distributed real-time computer system having an FTMDU.

BACKGROUND

A distributed real-time computer system for controlling a critical process comprises a number of external computers which exchange time-controlled messages using a fault-tolerant message distribution unit, FTMDU.

SUMMARY

A problem addressed by the invention is that of specifying how a fault-tolerant global time can be provided.

This problem is solved by a method as mentioned above, in that, according to the invention, the FTMDU comprises at least four components—a first component, a second component, a third component, and a fourth component—wherein each of the four components is connected to the other three components of the FTMDU via two or at least two independent communication paths, wherein these four components establish a fault-tolerant global time by means of internal synchronization messages after a power-up of the FTMDU and maintain said global time during the operation of the FTMDU, and wherein the four components supply the global time to the external computers by means of periodic external synchronization messages, and wherein the external computers each set their local clock to the received global time, and wherein each external sender of a time-controlled message transmits two message copies of the message to be sent via two different communication channels to two different components of the FTMDU at periodic sending times defined a priori in timetables, expressed in global time, and wherein these two message copies are delivered within the FTMDU via two independent communication paths to those two components of the FTMDU which are connected to an external receiver of the message via communication channels, and wherein the external receiver verifies the validity of the incoming message copy and accepts the valid message copy that arrived first and discards the second, subsequently arriving message copy.

Such a method also makes the fault-tolerant transport of time-controlled messages possible.

Furthermore, the aforementioned problem is solved by means of an FTMDU which is designed to execute a method described above or for use in such a method, wherein, according to the invention, the FTMDU comprises four components—a first component, a second component, a third component, and a fourth component—wherein each of the four components is connected to the other three components of the FTMDU via two or at least two independent communication paths, wherein these four components establish a fault-tolerant global time by means of internal synchronization messages after a power-up of the FTMDU and maintain said global time during the operation of the FTMDU, and wherein the four components are designed to supply the global time to the external computers by means of periodic external synchronization messages, such that the external computers each set their local clock to the received global time, and wherein, when each external sender of a time-controlled message transmits two message copies of the message to be sent via two different communication channels to two different components of the FTMDU at periodic sending times defined a priori in timetables, expressed in global time, the FTMDU is designed to deliver these two message copies within the FTMDU via two independent communication paths to those two components of the FTMDU which are connected to an external receiver of the message via communication channels.

In addition, the aforementioned problem is solved by means of a distributed real-time computer system, which comprises external computers and the fault-tolerant message distribution unit, FTMDU, described above.

According to the invention, the FTMDU is designed to establish and maintain a fault-tolerant global time.

The FTMDU contains at least four independent components which, via redundant communication channels for transmitting messages, are connected to one another and to the external computers of the distributed real-time computer system.

Each of these components forms a fault containment unit, FCU, [Kop11, p. 136]. A failure of a component, i.e., of an FCU, is to be tolerated by the FTMDU.

One, preferably all, of the components of the FTMDU contains a computer, an oscillator, a tick counter and software for synchronizing the (local) tick counter and for transmitting messages. The periodic points in time for the transmission of time-controlled messages are taken from timetables within the component, which were created a priori.

Each external computer of the distributed real-time computer system must be connected to two independent internal components of the FTMDU via at least two independent communication channels in order to be able to tolerate the failure of a communication channel or a component. Within the FTMDU, every message exchange between two components of the FTMDU must take place via two independent communication paths.

Immediately after power-up, in the start-up phase of the FTMDU, a central master algorithm is used to establish a synchronized time within the at least four components of the FTMDU.

This internal synchronization is then maintained by a distributed, fault-tolerant synchronization algorithm [e.g., the FTA algorithm; see Kop11, p. 69].

After the end of the start-up phase, external synchronization messages are sent from the FTMDU to the external computers of the distributed real-time computer system at recurring points in time defined a priori. These external synchronization messages have the fail-silent property, i.e., they are either correct or noticeably incorrect. An external computer sets its local clock to the time contained in the first valid external synchronization message that arrives.

An external computer sends two copies of a message simultaneously to two independent components of the FTMDU at periodic points in time that are defined a priori and that are contained in a timetable of an external sender. These two copies are transmitted on two different communication paths within the FTMDU to those two independent components of the FTMDU that are connected to the receiver of the message. The receiver accepts the valid copy of the message that arrives first and discards the second copy that arrives subsequently.

Definitions of Terms

External computer: a computer of the distributed real-time computer system that either sends messages to the FTMDU (external sender) or receives messages from the FTMDU (external receiver).

External synchronization message: a synchronization message for synchronizing the clocks of the external receivers. An external synchronization message is fail-silent, i.e., it is either correct or is recognized as incorrect. The error detection of an incorrect synchronization message can preferably take place by verifying an electronic signature that is contained in the external synchronization message.

External receipt time: the point in time defined a priori at which a correct external synchronization message arrives at the external receiver and which is contained in the payload of the external synchronization message.

External synchronization time: a periodically recurring point in time that is defined as part of the system design and at which an external synchronization message is sent by a component of the FTMDU. The external synchronization message is only sent to exactly this one internal component, which also does not receive external synchronization messages from any other internal component of the time server. The (internal) transmission of the external synchronization messages between two components of the time server takes place directly via a communication line which connects the two components directly, without going through other components.

Fault-tolerant message distribution unit (FTMDU): a message distribution unit consisting of a plurality of fault containment units (FCU) [see Kop11, p. 136], wherein the design ensures that the timely distribution of the messages can be performed even after failure of any FCU of the FTMDU.

Fault-tolerant clock synchronization algorithm: an algorithm for the fault-tolerant synchronization of the clocks in a distributed computer system [Kop11, p. 69].

Recorded receipt time: the point in time at which an external synchronization message was received, measured by the clock of the external receiver. The accuracy of the recorded receipt time can be improved by a hardware mechanism.

Global time: the time transmitted by the FTMDU, the corresponding ticks of which are within a defined precision for all external receivers (see [Kop11, p. 55] for the term precision).

GPS receiver: an electronic unit that receives the satellite signals from the GPS satellites and transmits a time signal accordingly, expressed in SI seconds, to the time server, in particular to the components of the time server which are connected to the GPS receiver [Dan97].

GPS time: a worldwide time signal synchronized with the SI second, which is transmitted by the GPS system and can be received by a GPS receiver [Dan97].

Validity of a message: a message is valid if the verification of the data of a message using the CRC field contained in the message does not find any errors.

Internal synchronization message: a synchronization message for the internal synchronization of the tick counters of the components within the FTMDU. Internal synchronization messages are transmitted between the internal components of the FTMDU.

Internal synchronization time: a periodically recurring point in time that is defined as part of the system design and at which an internal synchronization message is sent.

Communication channel: a transmission path for messages from a sender to one or more receivers.

Communication controller: the unit within a computer that establishes the connection between an external communication channel and the computer's memory, and handles the communication protocol.

Communication path: a chain of one or more communication channels from a sender via intermediate components to one or more receivers.

Component: a computer of the FTMDU, having an oscillator, a tick counter and the associated software.

Message: a data structure that contains at least three fields, specifically the header, the payload and the CRC field, the header specifying where the message is to be sent, the payload containing the bit vector of the data to be sent, and the CRC field containing redundant data, by means of which the validity of the data of the message can be verified.

Physical proximity fault: a cause of failure that affects all objects that are located in an adjacent physical environment.

Semantic validity of a message: a message is semantically valid if it is valid and if the electronic signature of the sender contained in the message proves the authenticity and integrity of the transmitted data.

Start-up message: a message within the FTMDU for synchronizing the internal clock, which message is sent in the start-up phase.

Start-up phase: the time interval immediately after the power-up of the internal components of the FTMDU. During the start-up phase, the tick counters of the components within the FTMDU are synchronized using a central master algorithm [Kop11, p. 68].

Independent communication controllers of the FTMDU: two communication controllers of the time server are independent if they are arranged on different components of the FTMDU.

Time stamp: a data structure that records the point in time at which a significant event occurred, measured by the clock of the observer of the event.

Timetable: a data structure that contains the periodic points in time at which certain actions, for example the sending of a certain message in a time-controlled system, are contained. The timetables are created a priori, i.e., before a service is used, for example during the system design.

Advantageous embodiments of the method according to the invention, the FTMDU according to the invention, and the distributed real-time computer system according to the invention are described below:

To establish and maintain the fault-tolerant global time, each of the four components can comprise an oscillator and a local tick counter, for example an internal computer having an oscillator and a local tick counter, wherein, after a power-up, the local tick counter of each component is initialized with an identical value, preferably the value zero, wherein the value of the local tick counter of a component is increased by a fixed value, preferably by the value 1, in each period of the component's oscillator, wherein, in a start-up phase after power-up of the time server, one of the four components, e.g., the first component, sends a start-up message with a current status of its local tick counter at the time the start-up message was sent to the other components, and wherein each receiver of the start-up message sets its local tick counter to the value contained in the start-up message, corrected by a transport delay of the start-up message, which delay is known a priori, and wherein each of the four components simultaneously sends an internal synchronization message, which contains the status of their local tick counter at the time the internal synchronization message was sent, to the other three components at periodic internal synchronization times defined a priori, and wherein each receiver of an internal synchronization message records the status of its local tick counter at the receipt time of the internal synchronization message and determines the time difference between the sending time contained in the internal synchronization message and the recorded receipt time of the internal synchronization message, corrected by the delay of the internal synchronization message, which delay is known a priori, and wherein each internal computer of a component determines a correction term for the tick counter contained in its component from these time differences according to a fault-tolerant clock synchronization algorithm and corrects the status of the local tick counter by this correction term, and wherein two of the four components, for example, the first component and the third component, each form an external synchronization message that contains an external receipt time of this external synchronization message, which is defined a priori, wherein the two external synchronization messages contain the same external receipt time, and these two components each simultaneously send these external synchronization messages, at periodic external synchronization times defined a priori, directly to one of the other components via a communication channel, but not to the same component of the other two components, e.g., the first component to the second component, and the third component to the fourth component, and wherein each of the components of the time server to which an external synchronization message has been sent verifies whether the external receipt time contained in the received external synchronization message is set relative to the status of the local tick counter of said component at the receipt time of the external synchronization message in the manner specified by an a priori scheduling of the external synchronization time and the external receipt time, and, if this is not the case, discards the external synchronization message, and, if this is the case, transmits the external synchronization message via an external communication controller of the component to an external receiver at a point in time, in particular a point in time defined a priori, which ensures that the external synchronization message arrives at the external receiver at the external reception time contained in the external synchronization message, and wherein each external receiver records the receipt time of the external synchronization message that arrives first with its local clock and then corrects the status of its local clock by the difference between the recorded receipt time of the external synchronization message and the external receipt time contained in the external synchronization message.

It can be provided that components which generate an external synchronization message provide this external synchronization message with an electronic signature and that the receiver of this external synchronization message verifies, on the basis of this electronic signature, whether the message is valid and discards the message if it is invalid.

The time interval between two external synchronization messages preferably corresponds to a power of the SI second.

External synchronization messages can each include a data field containing data about the internal state of the time server.

A time-controlled message can be provided with an electronic signature by its external sender, and the external receiver can use this signature to verify whether the time-controlled message is semantically valid, wherein the external receiver discards semantically invalid messages.

The FTMDU can comprise at least one GPS receiver, and the periodic external synchronization messages can distribute the GPS time.

The FTMDU can be divided into two physically separate subsystems.

The two subsystems are preferably separated from one another in physical space in such a way, for example are arranged so far away from one another, that a physical cause of error can impact only one of the two subsystems.

The two subsystems preferably each have an independent power supply.

A GPS receiver can be contained in each of the separate subsystems or a dedicated GPS receiver can be assigned to each subsystem.

The components of the FTMDU can be equipped with a hardware device which is designed to record the exact time of the arrival of a message in a time stamp.

The external computers of the distributed real-time computer system are preferably equipped with a hardware device which is designed to record the exact point in time of the arrival of a message in a time stamp.

Each external computer is preferably connected to the FTMDU via two communication channels, wherein each communication channel is connected to a different component of the FTMDU, and wherein the external computers are designed to each send two copies of an external message to the FTMDU via the two independent communication channels, which terminate at the two respective different components of the FTMDU, and wherein the FTMDU is designed to transmit these two copies to another external computer via two independent communication channels.

BRIEF DESCRIPTION OF THE DRAWINGS

The invention is explained in more detail below with reference to the drawings, which show.

DETAILED DESCRIPTION

Figure 1:
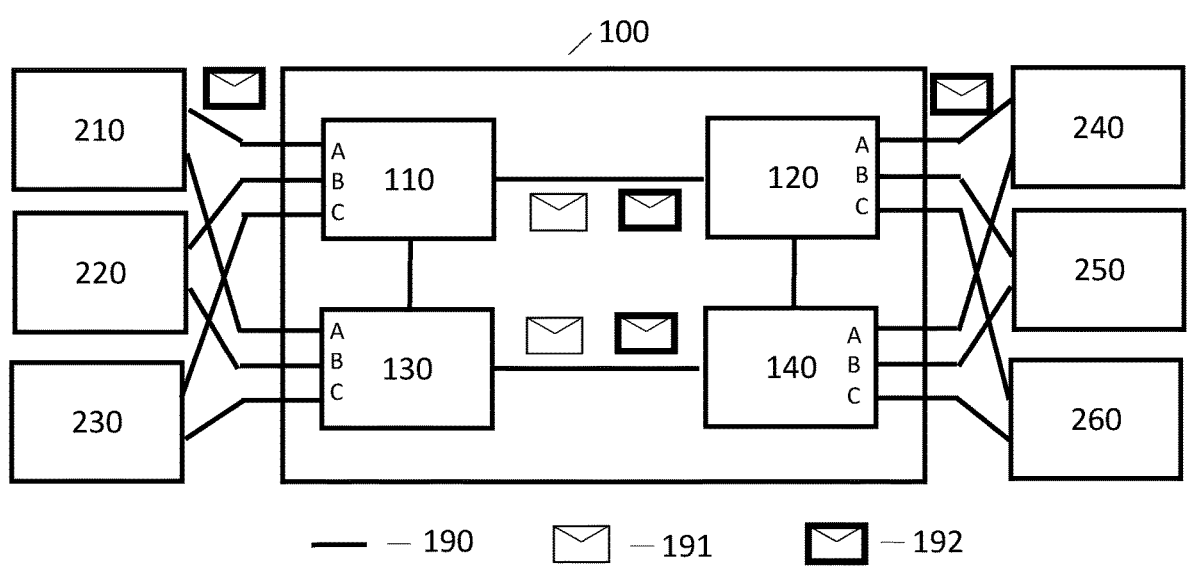
FIG. 1 an FTMDU having four internal components and six external computers of a distributed real-time computer system, FIG. 2 an FTMDU having an integrated GPS receiver, and FIG. 3 an FTMDU which consists of two mechanically separated assemblies.

FIG. 1 shows an FTMDU 100 comprising four components 110, 120, 130, 140 (a first component 110, a second component 120, a third component 130 and a fourth component 140), wherein the first component 110 is connected to the second and the third components 120, 130; the second component 120 to the first and fourth components 110, 140; the third component 130 to the first and fourth components 110, 140; and, correspondingly, the fourth component 140 to the second and third components 120, 130, in each case via a bi-directional communication channel 190 for transmitting messages.

Each of the four components 110, 120, 130, 140 has at least five communication controllers for sending and receiving messages, two internal communication controllers, and at least three external communication controllers A, B, C. The FTMDU 100 is connected to external computers of the real-time computer system via the external communication controllers, in this specific case to six computers 210-260.

A distinction is made between two types of messages, specifically the internal messages 191, which are transmitted within the FTMDU 100, and the external messages 192, which can be transported both within the FTMDU 100 and between a component of the FTMDU and an external computer. The clocks of the components of the FTMDU 100 are synchronized by means of the internal messages 191.

Creating a Fault-Tolerant Global Time

Each of the four components 110, 120, 130, 140 preferably has an internal computer having an oscillator and a local tick counter, as well as software that executes a clock synchronization algorithm, and, after switching on a component, the power-up, an initialization routine is preferably triggered, which initializes the local tick counter of each component with the value zero, wherein the value of the local tick counter is increased by 1 per period of the oscillator.

After the power-up of the FTMDU 100 or of the components 110, 120, 130, 140, the start-up phase of the FTMDU 100 begins. During the start-up phase, a designated component of the FTMDU, for example the first component 110, takes on the role of a time master. The time master sends an internal start-up message 191 with the content of its local tick counter (or with the content of the GPS time from the GPS sensor 150; see FIG. 2) to the three other components 120, 130, 140 simultaneously. Each receiver of the start-up message corrects the tick counter contained in the start-up message by the transport delay of the start-up message, which is known a priori, and writes this corrected value into its tick counter. At this point in time, the local tick counters of all of the clocks are synchronized. The time of arrival of an incoming message can be precisely recorded in a time stamp by using supporting hardware mechanisms.

Before a message transport is used—i.e., a priori—periodic internal synchronization times are defined, at which the local tick counters of the components are corrected in order to correct the deviations in the clocks occurring in the time interval between two synchronization times.

Each of the four components sends an internal synchronization message 191 to the three other components of the FTMDU 100 at each internal synchronization time. An internal synchronization message 191 contains in its payload the status of the local tick counter of the sender at the time of sending.

Each receiver of an internal synchronization message 191 keeps the status of its local tick counter at the receipt time of the internal synchronization message 191 (preferably by means of a hardware mechanism in the communication controller that records the receipt time of the incoming message in a time stamp).

Each component determines the time differences between the sending times contained in the internal synchronization messages and the recorded receipt times, corrects this time difference by the delays of the internal synchronization message known a priori, and transfers these time differences to a fault-tolerant clock synchronization algorithm. In FIG. 1, four time differences are available to the algorithm in component 110: three from the messages from the component 120, 130, 140, and the time difference zero from the tick counter of component 110. (Component 100 assumes that it is correct).

Fault-tolerant clock synchronization algorithms are described in detail in the technical literature [e.g., Kop11, p. 69]. A fault-tolerant clock synchronization algorithm is executed in each component and determines a correction value for its own clock from the total of the determined time differences of all of the clocks. The tick counter of the component's own clock is corrected using this correction value. The term 'precision' of an assembly describes the precision of the internal synchronization [Kop11, p. 55].

As part of the system design, periodic external synchronization times and corresponding receipt times of an external synchronization message are defined and stored in a timetable of each component. An external synchronization message contains in its payload the planned receipt time of this message by the external receiver, and preferably an electronic signature of the sender. An external synchronization message arriving at a computer is semantically valid if the content of the message matches the signature contained in the message. It is assumed that the sender's electronic signature cannot be forged.

An external synchronization message can also contain information in its payload about the internal state of the FTMDU 100 for diagnostic purposes, for example, information about the field strength of the GPS signal from the GPS receiver 150.

The periodic synchronization times of the external synchronization messages that are stored in the timetable of each component should preferably be selected such that the time interval between two synchronization messages corresponds to a (negative) power of the SI second. This time difference can be derived from the GPS time, which uses the SI second as the basis for the time count. If the external synchronization messages are synchronized with the GPS time, the time base of the distributed computer system is synchronized worldwide with all other computers that are based on the GPS time.

The component 110 of FIG. 1 sends an external synchronization message intended for computers 240, 250, 260 to the component 120. The component 120 verifies the correctness of the receipt time contained in the external synchronization message. This receipt time is correct if the status of the clock of the component 120 at the receipt time of the external synchronization message is within an interval defined a priori before the receipt time which is contained in the external synchronization message. If the external synchronization message is incorrect, the message is discarded. Otherwise, the message is sent from the component 120 via the communication controllers 120-A, 120-B, 120-C to the computers 240, 250, 260 at that point in time which ensures that the message arrives at the computers 240, 250, 260 at the receipt time contained in the external synchronization message.

Analogously, the component 130 in FIG. 1 sends an external synchronization message intended for computers 240, 250, 260 to component 140. The component 140 verifies the correctness of the receipt time contained in the external synchronization message. This receipt time is correct if the status of the clock of the component 140 at the receipt time of the external synchronization message is within an interval defined a priori before the receipt time which is contained in the external synchronization message. If the external synchronization message is incorrect, the message is discarded. Otherwise, the message is sent from the component 140 via the communication controllers 140-A, 140-B, 140-C to the computers 240, 250, 260 at that point in time which ensures that the message arrives at the computers 240, 250, 260 at the receipt time contained in the external synchronization message.

If there is no error, two external synchronization messages arrive at each of the computers 240, 250, 260 almost simultaneously (i.e., within the precision; see [Kop11, p. 55]), one from component 120 and the second from component 140. An external receiver uses the external synchronization message that arrives first to correct its clock and discards the second external synchronization message that arrives subsequently.

The method described above for the external synchronization of the clocks is carried out in the same way by the components 120, 140 with respect to the external computers 210, 220, 230.

Fault-Tolerant Transmission of Time-Controlled Real-Time Messages

As soon as all of the clocks of the external computers have been synchronized in the manner described above, the fault-tolerant transmission of time-controlled real-time messages can begin.

The FTMDU 100 of FIG. 1 is connected to each of the six external computers 210, 220, 230, 240, 250, 260 of the distributed real-time computer system via two communication channels each, wherein two copies of an external message 192 are transmitted to an external computer, in each case via two independent communication channels sending to different components of the FTMDU 100. For example, the external computer 210 is connected to the component 110 via its communication controller 110-A, and to the component 130 via its communication controller 130-A.

The case to be considered now is one in which the external sender 210 sends the two copies of a time-controlled message to the external receiver 260 via the FTMDU 100 at a periodic point in time defined a priori. The first copy is sent from the external sender 210 to the communication controller 110-A and from there to the communication controller 120-C and on to the external receiver 260. The second copy is sent from the external sender 210 via an independent communication path to the communication controller 130-A and from there to the communication controller 140-C and on to the external receiver 260. The two copies of the message arrive almost simultaneously at the external receiver 260 (i.e., within the precision; see [Kop11, p. 56]). The external receiver 260 verifies the validity of the copies and accepts the valid copy of the message that arrives first and discards the second copy that arrives subsequently.

Each copy of the message can preferably contain a digital signature of the sender 210 in addition to the data to be transmitted. The receiver of the message 260 verifies the content of the message using the signature contained in the message and only accepts a message if it is semantically valid.

The architecture described herein of the FTMDU 100 ensures that the message exchange between the external sender 110 and the external receiver 260 is maintained even if one of the internal components 110, 120, 130, 140 of the FTMDU 100 or one of the communication channels 190 fails.

Figure 2:
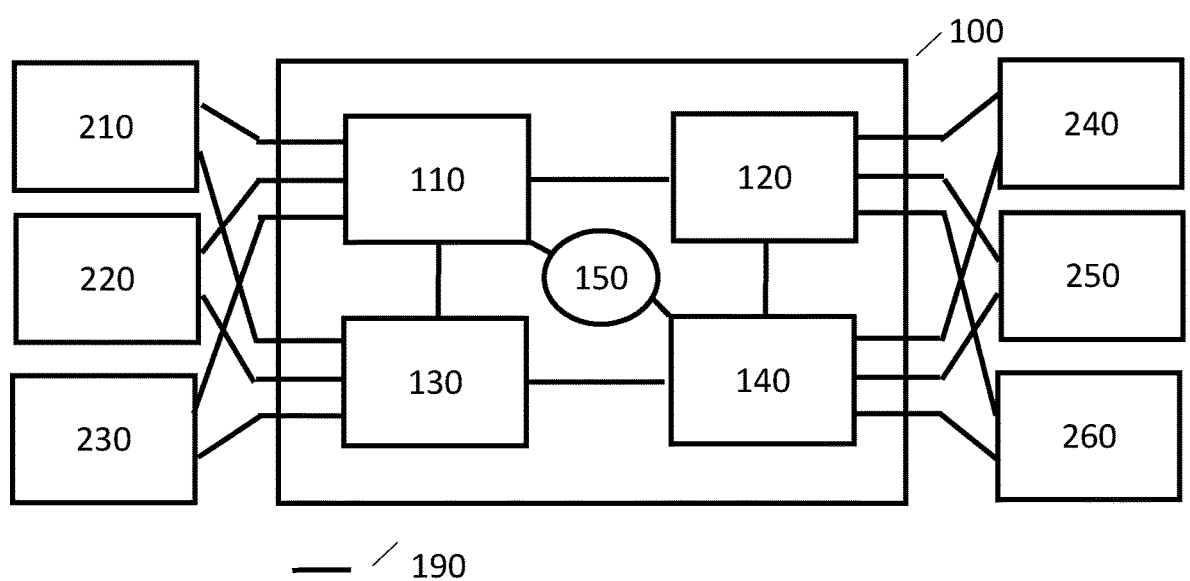

FIG. 2 shows the FTMDU 100 from FIG. 1, which additionally comprises a GPS receiver 150 which is connected to at least one of the components of the FTMDU 100, in the specific example to the two components 110, 140. The GPS receiver can be used to synchronize the global time with the GPS time. The GPS signal of the Global Positioning System contains a worldwide synchronized time signal having a precision of better than 100 nsec. By means of this signal, the global time of the external receivers can be synchronized worldwide.

It is advantageous if the components of the FTMDU which import the time signal from the GPS receiver 150 verify the plausibility of this time signal. For example, the dynamics of the field strength of the incoming GPS signals can be monitored, or a sudden change in the time offered can be determined in order to detect an intrusion.

In an embodiment as shown in FIG. 1 or FIG. 2, it can furthermore also be possible that, in addition to the connections 190 shown between the four components, a bi-directional communication channel is also provided between the first and fourth components and the second and third components in each case.

If all of the components of the FTMDU are arranged in an adjacent physical environment, a physical proximity fault can damage more than one component of the FTMDU and thus lead to a total failure of communication.

Figure 3:
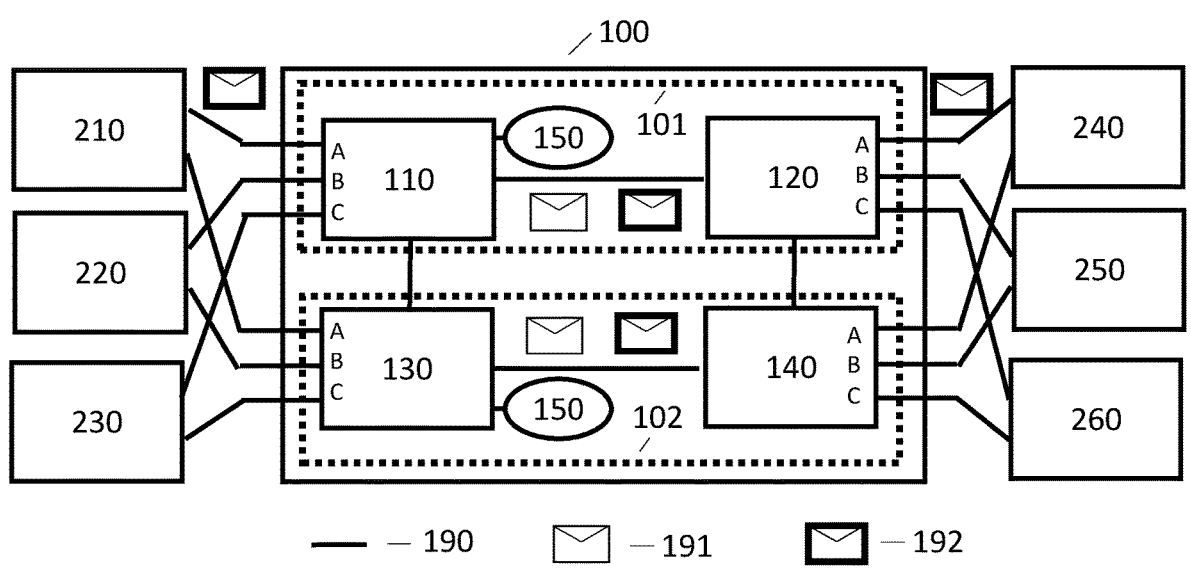

In order to control this situation, the FTMDU can be separated into two assemblies 101, 102, as shown in FIG. 3, wherein the two assemblies 101, 102 are preferably accommodated at different physical locations. A total failure of communication can only occur if both assemblies 101, 102 are destroyed.

If each of the two assemblies 101, 102 in FIG. 3 contains an independent power supply, the communication within the real-time system can be maintained even after one of the two assemblies fails.

If each of the two assemblies 101, 102 in FIG. 3 contains its own GPS receiver, the GPS synchronization can also be maintained if one assembly fails.

It should be noted that, after one of the two assemblies 101, 102 of the FTMDU 100 is destroyed, the fault tolerance of the clock synchronization and the fault tolerance of the message transmission are lost.

LITERATURE CITED

[Dan97] Dana, P. H. Global Positioning System (GPS) Time Dissemination for Real-Time Applications. Real-time systems. Vol 12. No. 1., pp. 9-40. 1997

[Kop11] Kopetz, H. Real-Time Systems, Design Principles for Distributed Embedded Applications. Springer Verlag. 2011.

I claim:

1. A method, comprising:
providing a fault-tolerant global time and for the fault-tolerant transport of time-controlled messages in a distributed real-time computer system which comprises external computers (210, 220, 230, 240, 250, 260) and a fault-tolerant message distribution unit (100), FTMDU, wherein each external computer can be an external sender and/or an external receiver of messages comprising time-controlled messages, wherein the FTMDU comprises at least four components (110, 120, 130, 140) comprising a first component (110), a second component (120), a third component (130), and a fourth component (140), wherein each of the four components (110, 120, 130, 140) is connected to the other three components of the FTMDU via two or at least two independent communication paths, wherein these four components (110, 120, 130, 140), after a power-up of the FTMDU, establish a fault-tolerant global time by means of internal synchronization messages (191) and maintain this global time while the FTMDU is operating, wherein the four components (110, 120, 130, 140) supply the global time to the external computers (210, 220, 230, 240, 250, 260) by means of periodic external synchronization messages (192), wherein the external computers each set their local clock to the received global time, wherein each external sender of a time-controlled message transmits two message copies of the message to be sent via two different communication channels to two different components of the FTMDU at periodic sending times defined a priori in timetables, expressed in global time, wherein these two message copies are delivered within the FTMDU via two independent communication paths to those two components of the FTMDU which are connected to an external receiver of the message via communication channels, wherein the external receiver verifies the validity of the incoming message copy and accepts the valid message copy that arrived first and discards the second, subsequently arriving message copy.

2. The method according to claim 1, wherein, in order to establish and maintain the fault-tolerant global time, each of the four components (110, 120, 130, 140) comprises an oscillator and a local tick counter comprising an internal computer having an oscillator and a local tick counter, wherein, after a power-up, the local tick counter of each component (110, 120, 130, 140) is initialized with an identical value, wherein the value of the local tick counter of a component is increased by a fixed value in each period of the component's oscillator, wherein, in a start-up phase after power-up of the time server (100), one of the four components sends a start-up message with a current status of its local tick counter at the time the start-up message was sent to the other components (120, 130, 140), and wherein each receiver (110, 120, 130) of the start-up message sets its local tick counter to the value contained in the start-up message, corrected by a transport delay of the start-up message that is known a priori, and wherein each of the four components (110, 120, 130, 140) simultaneously sends an internal synchronization message, which contains the status of their local tick counter at the time the internal synchronization message was sent, to the other three components at periodic internal synchronization times defined a priori, and wherein each receiver of an internal synchronization message records the status of its local tick counter at the receipt time of the internal synchronization message and determines the time difference between the sending time contained in the internal synchronization message and the recorded receipt time of the internal synchronization message, corrected by the delay of the internal synchronization message that is known a priori, and wherein each internal computer of a component determines a correction term for the tick counter contained in its component from these time differences according to a fault-tolerant clock synchronization algorithm and corrects the status of the local tick counter by this correction term, and wherein two of the four components each form an external synchronization message (192) that contains an external receipt time of this external synchronization message, which is defined a priori, wherein the two external synchronization messages contain the same external receipt time, and these two components each simultaneously send external synchronization messages, at periodic external synchronization times defined a priori, directly to one of the other components (120, 130) via a communication channel (190), but not to the same component of the other two components, and wherein each of the components (120, 140) of the time server (100) to which an external synchronization message has been sent verifies whether the external receipt time contained in the received external synchronization message is set relative to the status of the local tick counter of said component at the receipt time of the external synchronization message in the manner specified by an a priori scheduling of the external synchronization time and the external receipt time, and wherein, if this is not the case, discards the external synchronization message, and wherein, if this is the case, transmits the external synchronization message via an external communication controller (A, B, C) of the component (110, 120, 130, 140) to an external receiver at a point in time, in particular a point in time defined a priori, which ensures that the external synchronization message arrives at the external receiver at the external receipt time contained in the external synchronization message, wherein each external receiver records the receipt time of the external synchronization message arriving first using its local clock and then corrects the status of its local clock by the difference between the recorded receipt time of the external synchronization message and the external receipt time contained in the external synchronization message.

3. The method according to claim 2, wherein components (110, 130), which generate an external synchronization message, provide this external synchronization message with an electronic signature, and wherein the receiver of this external synchronization message verifies, on the basis of this electronic signature, whether the message is valid and discards the message if it is invalid.

4. The method according to claim 2, wherein the time interval between two external synchronization messages corresponds to a power of the SI second.

5. The method according to claim 2, wherein external synchronization messages (192) each include a data field which contains data about the internal state of the time server (100).

6. The method according to claim 1, wherein a time-controlled message is provided with an electronic signature by its external sender, and the external receiver uses this signature to verify whether the time-controlled message is semantically valid, and wherein the external receiver discards semantically invalid messages.

7. The method according to claim 1, wherein the FTMDU comprises at least one GPS receiver (150) and the periodic external synchronization messages (192) distribute the GPS time.

8. A fault-tolerant message distribution unit, FTMDU, for executing a method according to claim 1, wherein the FTMDU comprises four components (110, 120, 130, 140) comprising a first component (110), a second component (120), a third component (130), and a fourth component (140), wherein each of the four components (110, 120, 130, 140) is connected to the other three components of the FTMDU via two or at least two independent communication paths, wherein these four components (110, 120, 130, 140), after a power-up of the FTMDU, establish a fault-tolerant global time by means of internal synchronization messages (191) and maintain this global time while the FTMDU is operating, wherein the four components (110, 120, 130, 140) are designed to supply the global time to the external computers (210, 220, 230, 240, 250, 260) by means of periodic external synchronization messages (192), wherein the external computers each set their local clock to the received global time, and wherein, when each external sender of a time-controlled message transmits two message copies of the message to be sent via two different communication channels to two different components of the FTMDU at periodic sending times defined a priori in timetables, expressed in global time, wherein the FTMDU is designed to deliver these two message copies within the FTMDU via two independent communication paths to those two components of the FTMDU which are connected to an external receiver of the message via communication channels.

9. The message distribution unit according to claim 8, wherein the FTMDU is divided into two physically separate subsystems (101, 102).

10. The message distribution unit according to claim 9, wherein the two subsystems (101, 102) are separated from one another in physical space in such a way that a physical cause of error can impact only one of the two subsystems.

11. The message distribution unit according to claim 9, wherein the two subsystems (101, 102) each have an independent power supply.

12. The message distribution unit according to claim 9, wherein a GPS receiver is contained in each of the separate subsystems (101, 102), or a dedicated GPS receiver is assigned to each subsystem.

13. The message distribution unit according to claim 8, wherein its components (110, 120, 130, 140) are equipped with a hardware device which is designed to record the exact time of the arrival of a message in a time stamp.

14. A distributed real-time computer system comprising external computers (210, 220, 230, 240, 250, 260) and a fault-tolerant message distribution unit (100), FTMDU, wherein the FTMDU is designed according to claim 8.

15. The real-time computer system according to claim 14, wherein the external computers are equipped with a hardware device which is designed to record the exact time of the arrival of a message in a time stamp.

16. The real-time computer system according to claim 14, wherein each external computer (210, 220, 230, 240, 250, 260) is connected to the FTMDU (100) via two communication channels, wherein each communication channel is connected to a different component of the FTMDU (100), and wherein the external computers are designed to each send two copies of an external message (192) to the FTMDU (100) via the two independent communication channels which terminate at the two respective different components of the FTMDU (100), and wherein the FTMDU (100) is designed to transmit these two copies to another external computer via two independent communication channels.

\* \* \* \* \*